United States Patent Office.

MANFRED M. GRISWOLD, OF COLUMBUS, OHIO.

Letters Patent No. 70,551, dated November 5, 1867; antedated November 1, 1867.

PHOTOGRAPHIC PROCESS.

The Schedule referred to in these Letters Patent and making part of the same.

Specification of a certain improved Photographic Surface, and the process and compositions for preparing the same, invented by MANFRED M. GRISWOLD, of Columbus, in the county of Franklin, and State of Ohio.

My invention relates to certain improvements in the "improved photographic surface, and the compositions and process for preparing the same," for which Letters Patent of the United States were granted to Victor Moreau Griswold, on the tenth day of April, 1866, and it consists—

First, in an improved surface or plate for photographic purposes, hereinafter described.

Second, in an improved composition of the collodion or enamel with which the plate or other surface is covered, in order to produce upon it a white opaque film, by which I use but five ingredients, instead of eight, thus simplifying the operation, and producing as good or better results.

Third, in baking the plate after the above white surface is produced upon it, which makes the process simpler and more certain, prevents the sensitizing solution from forming little bubbles and spoiling the work, causes the sensitizing solution to flow better and more evenly over the work and adhere better to it, and which removes the slight ridges or roughness on the surface of the white enamel, and renders it smoother than when not baked. The baking of the plate changes the white surface to one of deep black, and it is restored to a clear white by the application of the sensitizing solution.

Fourth, in the manner of restoring the white color of the plate after it has been baked, substantially as hereinafter set forth.

In carrying my invention into practice, I first coat the surface of any black enamelled plate, such as is used for photographic purposes, or glass, on other suitable surface, with a white opaque coating or film, which is produced by the application to the surface of the plate of the following solution: Sulphuric ether, six ounces; alcohol, (ninety-five to ninety-eight per cent.,) six ounces; acetic ether, one to three ounces; gum-kowrie or gum-sandarac, one-half to one ounce. To each ounce of the above, soluble cotton, from five to eight grains. The common gun-cotton may be used, but I prefer a cotton that gives an opaque film of itself, when mixed with ether or alcohol. If the ordinary soluble cotton is used in the composition of the enamel, I recommend the addition of a few grains of cyanide of potassium, sufficient to rot the collodion, and that it be allowed to stand for some time for that purpose.

The above solution is poured over the surface of the plate, and then dried in an ordinary atmosphere, or by the application of a gentle heat, so that the film shall dry perfectly white. The plate thus coated is then exposed to the heat of an oven or stove till the heat gives it a deep black color.

The next step is to apply the sensitive coating to this black surface. The composition of the solution for producing this coating is as follows: Sulphuric ether, six ounces; alcohol, six ounces; acetic ether, from one to three ounces; (to each ounce of the above, chloride of strontium, three to five grains;) nitrate of silver, ten to twenty grains; soluble cotton, five to eight grains; citric acid, three to five grains; nitrate of uranium, one grain. Any good gun-cotton used for photographic purposes will do; that which gives the most limpid and fluid collodion is the best. By the addition of the acetic ether to the sensitizing solution the black surface of the plate, which is produced by baking it, is restored to its original whiteness on the application to it of the sensitizing solution.

The baked plates, above described, may be manufactured and supplied to operators ready to receive the sensitive coating, and I am of the opinion that the white sensitized plates can be prepared and delivered to the trade ready to print on, as I have kept them two weeks without deterioration.

Having thus fully described my invention, I claim—

1. The black baked photographic plate, prepared substantially as hereinabove set forth, as a new article of manufacture.

2. The composition of the enamel or collodion for producing the original white surface, substantially as described.

3. Baking the plate subsequent to the application of the white collodion film, substantially as set forth.

4. Restoring the white color to the surface of the plate, subsequent to its being baked, as set forth, or in any manner substantially the same.

M. M. GRISWOLD.

Witnesses:
   THOS. P. HOW,
   R. H. SEATON.